3,127,387
PROCESS OF PRODUCING POLYETHYLENE USING CYCLOHEXENE AS A CHAIN MODIFIER
George E. Ham, Leawood, Kans., and William H. Byler, Nicholas O. Cromwell, and Sam J. Manci, all of Orange, Tex., assignors to Spencer Chemical Company, Kansas City, Mo., a corporation of Missouri
No Drawing. Filed Feb. 29, 1960, Ser. No. 11,440
5 Claims. (Cl. 260—94.9)

This invention is concerned with a novel process of producing polyethylene of increased strength, stiffness and density having good processability.

Polyethylene is produced commercially by the conventional high pressure continuous process at pressures generally in the range of 12,000 to 30,000 p.s.i., and usually at 15,000 to 21,000 p.s.i., employing temperatures from about 120° C. to 250° C., and generally from 130° C. to 220° C. The dependent relationship of temperature to pressure within such ranges needed to produce resinous materials is known to those skilled in the art, so that unsuitable conditions would clearly not be chosen for this purpose.

Although resinous polyethylene produced by the conventional high pressure process is inexpensive to produce and is characterized by chemical inertness, light weight, toughness and moldability which puts it in a favored position for the production of films, filaments and molded articles, it has an undesirably low melting point of around 100° C. and low stiffness characteristics. Although the lower polymerization temperatures could produce polyethylene of increased molecular weight which was harder and stiffer, the melt fluidity or melt index of the polymer was correspondingly decreased, i.e., it was more viscous at working temperatures and was difficult to process through either the polymerization equipment or the subsequent molding and fabricating processes.

According to the present invention there is provided higher density solid polyethylene of increased stiffness and tensile yield strength with melt indices of a range suitable for processing and commercial operations, viz., from about 0.1 to 40. Such polyethylene can be produced by polymerizing ethylene, advisably in the gaseous state, in the presence of a suitable polymerization initiator and at temperatures and pressures which effect polymerization, in the presence of added cyclohexene.

Temperatures of 50 to 190° C. and pressures of 12,000 to 30,000 p.s.i. are highly effective for producing the improved polyethylene in the presence of added cyclohexene. It must be understood, however, that the knowledge of the art is to be applied in determining the specific conditions to be used to give a suitable resinous polymer of acceptable properties when using cyclohexene. In this regard, it should be borne in mind that lowering the polymerization temperature increases the density and stiffness of the product while lowering the pressure decreases these properties.

Although wider ranges of temperature and pressure can be employed, the ranges of 100°–190° C., and advisable 120°–180° C., and 16,000 to 24,000 p.s.i. are advisably used for a continuous process. At lower temperatures polymerizations based on initiators which thermally generate free radicals require initiators which are generally more unstable and which are consequently more difficult to store and handle. In a batch operation, however, temperatures as low as 50° C. can be used successfully with an initiator, such as diethyl peroxydicarbonate, which operates best at about 120° C. in a continuous operation where contact time is immensely less than in a batch reactor.

The process is advisably a substantially gaseous process which does not necessarily employ the use of solvents or other inert liquid reaction media so that the resulting polyethylene need not be separated from such liquids. However, under the high pressure conditions of the reactor the ethylene and other additives may sometimes be liquid. Other additives, diluents or solvents can be present provided they do not adversely affect the polymerization process or product obtained but, since they are not needed, there is no reason to use them. When the pressure outside of the reactor is reduced, the ethylene polymer can be easily separated from the gaseous ethylene.

The same specific temperatures and pressures which are employed in this process would, if used identically without an additive, ordinarily result in a material of higher molecular weight, and consequently of higher melt viscosity, and thus would be more difficult to process.

The effect of cyclohexene in this process, acting either as a chain transfer agent (telogen) or a chain modifier, so controls the molecular weight that it is possible to produce resinous solid polyethylene which has insignificant lubricating oil solubility, a tensile yield point of about 1000 to 2500 p.s.i., a Vicat softening point of more than 100° C., a stiffness of at least 20,000 and up to 40,000 p.s.i. or above by the flexural method, a melt index generally in the range of 0.1 to 40, and more often in the easily processable range of about 0.5 to 20, and a density of at least 0.920 and up to 0.940. There is no copolymerization between the ethylene and cyclohexene.

The amount of cyclohexene employed can be varied considerably although generally from 0.005 to below 5.0 weight percent based on ethylene in the reactor, and advisably 0.01 to 1.0 weight percent, give excellent results. Experimental commercial runs show that 0.06% of cyclohexene based on the ethylene gives polyethylene having a melt index of 0.5 to 4 and with densities of 0.928 to 0.938 at polymerization pressures of about 20,000 to 25,000 p.s.i. and temperatures of 135° C. to 175° C.

Cyclohexene is a very active telogenating agent and very much smaller amounts of it are needed than of other such agents to obtain equivalent results. Thus, 0.06% of cyclohexene has been found to be as effective as 10% of propane which is taught to be a telogenating agent in United States Patent No. 2,921,059.

In producing the resinous solid polyethylene of this invention the compressed mixture of ethylene, initiator and cyclohexene advisably has a residence time under polymerization conditions of less than 15 minutes, and advisably less than 5 minutes. In a continuous system, a space velocity of at least 0.075 min.$^{-1}$ and generally of at least 0.20 min.$^{-1}$ is used. This is because greater residence times, generally, however, with significantly larger amounts of cyclohexene than needed in this invention, have the capacity to produce a softer polymer lacking the resinous characteristics specified above.

The polymerization initiator used is selected on the basis of its ability to sustain the polymerization reaction under the particular conditions employed. Some free radical initiators suitable for use in this invention will be apparent to those skilled in the art such as the peroxy compounds like lauroyl peroxide, tertiary butyl peracetate, caprylyl peroxide, diisopropyl peroxidicarbonate and diethyl peroxidicarbonate. Free radical azo initiators such as diethyl 2,2'-azobis-(2-methyl propionate), methyl azobisisobutyrate and azobisisobutyronitrile can also be used. About 50 to 20,000 p.p.m. based on the ethylene, and generally 100–250 p.p.m., of initiator are adequate for the process.

In a continuous system the cyclohexene can be introduced into the recycle or make-up ethylene stream. Cyclohexene is added to bring up the concentration to that desired from the lower concentration reached by consumption, and loss, of cyclohexene. A large amount, and sometimes nearly all, of the cyclohexene is consumed in the process. This makes it unnecessary to purge the unpolymerized ethylene of excess cyclohexene as is needed with other additives to avoid an accumulation thereof. This feature favors the use of cyclohexene in one or more reactors connected in parallel arrangement in which the discharge streams feed to a common point for mixing while the polymer is still dissolved and the ethylene is under fairly high pressure such as 5000 p.s.i. (See U.S. Patent 2,868,762, lines 50–55.)

Reactors are said to be in parallel arrangement to each other if they contribute their polymer content to form a common stream at a pressure no higher than the lowest pressure in a contributing reactor. Thus, each reactor can contribute its polymer discharge to a common stream for blending, or the discharge stream from the higher pressure reactor can be fed into the bottom zone of the lower pressure reactor for blending with the polymer therein to form a blend which discharges therefrom in a single stream.

In an illustrative continuous parallel system the reactor in which cyclohexene is present could be operated at 100°–190° C. and a pressure of 12,000 to 30,000 p.s.i. while the other reactor could be operated at 100°–275° C. and 8,000 to 15,000 p.s.i. with the amount of polymer from each reactor in the final product regulated to give a product of the desired properties.

Since the cyclohexene is largely consumed, the unused ethylene gas can be recycled or fed back and cyclohexene added to a substream thereof leading to any one or more of the parallel reactors while the remainder of the recycled ethylene can be fed to the other reactors. Thus, cyclohexene can be used only in specific reactors of a parallel system without a prior purification of the recycle gas, a practice which would not be possible with an additive that is not largely consumed.

The following example illustrates a specific embodiment of the invention.

EXAMPLE

Ethylene gas of 95.5% purity (the impurities being primarily ethane, propane and minor traces of propylene) was polymerized on a continuous scale in a cylindrical autoclave 3.63 inches in diameter and 40 inches long at an ethylene rate of 100 pounds per hour (this is a space velocity of about 0.12 min.$^{-1}$) with cyclohexene added in various concentrations and at various temperatures and pressures as recorded in Table 1 following. A control is included for comparison purposes.

Runs 1, 3 and the control used lauroyl peroxide as the initiator and run 2 used diisopropyl peroxydicarbonate as the initiator. Sufficient initiator was used to maintain the reaction.

by the flexural method, which comprises subjecting ethylene having dispersed therein a small amount up to 5 weight percent based on the ethylene of cyclohexene and a suitable free radical polymerization initiator also dispersed therein, in a continuous polymerization system to a pressure in the range of 12,000 to 30,000 p.s.i. and a temperature in the range of 50 to 190° C. with the specific temperature and pressure being selected to produce a resinous polymer of the said physical characteristics for a residence time under the polymerization conditions of not more than 15 minutes and recovering the polyethylene so produced.

2. The process of producing resinous polyethylene of insignificant solubility in lubricating oil having a density above 0.020, a melt index of 0.1 to 40, a tensile yield point of 1000 to 2500 p.s.i., a Vicat softening point of more than 100° C., and a stiffness of at least 20,000 p.s.i. by the flexural method, which comprises subjecting ethylene having dispersed therein a small amount up to 1 weight percent based on the ethylene of cyclohexene and a suitable free radical polymerization initiator also dispersed therein, in a continuous gaseous polymerization system to a pressure in the range of 12,000 to 30,000 p.s.i. and a temperature of 100° C. to 190° C. with the specific temperature and pressure being selected to produce a resinous polymer of the said physical characteristics at a space velocity of not less than 0.075 min.$^{-1}$ and recovering the polyethylene so produced.

3. The process of producing resinous polyethylene of insignificant solubility in lubricating oil having a density above 0.920, a melt index of 0.1 to 40, a tensile yield point of 1000 to 2500 p.s.i., a Vicat softening point of more than 100° C., and a stiffness of at least 20,000 p.s.i. by the flexural method, which comprises subjecting ethylene having dispersed therein a small amount up to 0.49 weight percent based on the ethylene of cyclohexene and a suitable free radical polymerization initiator also dispersed therein, in a continuous gaseous polymerization system to a pressure in the range of 16,000 to 24,000 p.s.i. and a temperautre of 120° to 180° C. with the specific temperature and pressure being selected to produce a resinous polymer of the said physical characteristics at a space velocity of not less than 0.2 min.$^{-1}$ and recovering the polyethylene so produced.

4. The process of producing polyethylene in a parallel system which comprises continuously polymerizing ethylene in a first reactor using a free radical initiator while simultaneously polymerizing ethylene containing up to 5 weight percent of cyclohexene using a free radical initiator in a second reactor continuously, the polymerization in each reactor being effected at a temperature of 100° C. to 190° C. and a pressure of 12,000 to 30,000 p.s.i. com-

*Table 1*

| Run | Temp., °C. | Pressure, p.s.i. | Cyclohexene Weight Percent in Reactor | Melt Index | Density of Polymer | Tensile Properties | | | | Shear Factor at 6 lbs. and 160° C. |
|---|---|---|---|---|---|---|---|---|---|---|
| | | | | | | Break, p.s.i. | Yield, p.s.i. | Elong., percent | Vicat, °C. | |
| Control [1] | 165 | 14,400 | None | 1 to 4 | 0.9227 | 1,360 | 1,700 | 185 | 97.6 | 95 |
| 1 | 165 | 19,000 | 0.21 | 2.84 | 0.9276 | 1,470 | 1,750 | 580 | 104.5 | 74.3 |
| 2 | 131 | 18,500 | 0.22 | 7.68 | 0.9313 | 1,510 | 2,230 | 200 | 108 | 58.3 |
| 3 | 111 | 24,500 | 0.49 | 8.97 | 0.9314 | 1,820 | 1,820 | 100 | 101.6 | 70.4 |

[1] Average of five runs.

Various changes and modifications of the invention can be made and, to the extent that such variations incorporate the spirit of this invention, they are intended to be included within the scope of the appended claims.

What is claimed is:

1. The process of producing resinous polyethylene of insignificant solubility in lubricating oil having a density above 0.920, a melt index of 0.1 to 40, a tensile yield point of 1000 to 2500 p.s.i., a Vicat softening point of more than 100° C., and a stiffness of at least 20,000 p.s.i.

bining the reaction products consisting essentially of a mixture of molten polyethylene and ethylene gas of each reactor at an elevated pressure and at an elevated temperature which maintain the polyethylene of each reactor molten thereby forming a composite mixture of polyethylene and ethylene gas, removing the ethylene gas, recovering the composite polyethylene, and recycling the ethylene without purging cyclohexene to at least one of the reactors for further polymerization.

5. The process of producing resinous polyethylene of insignificant solubility in lubricating oil having a density above 0.920, a melt index of 0.1 to 40, a tensile yield point of 1000 to 2500 p.s.i., a Vicat softening point of more than 100° C., and a stiffness of at least 20,000 p.s.i. by the flexural method, which comprises subjecting ethylene having dispersed therein a small amount up to 5 weight percent based on the ethylene of cyclohexene and a suitable free radical polymerization initiator selected from the group consisting of peroxy and azo compounds also dispersed therein, in a continuous polymerization system to a pressure in the range of 12,000 to 30,000 p.s.i. and a temperature in the range of 50 to 190° C. with the specific temperature and pressure being selected to produce a resinous polymer of the said physical characteristics for a residence time under the polymerization conditions of not more than 15 minutes and recovering the polyethylene so produced.

References Cited in the file of this patent

UNITED STATES PATENTS

| | | |
|---|---|---|
| 2,327,705 | Frolich et al. | Aug. 24, 1943 |
| 2,586,332 | Franta | Feb. 19, 1952 |
| 2,771,463 | Field et al. | Nov. 20, 1956 |
| 2,868,762 | Oakes | Jan. 13, 1959 |
| 2,879,263 | Anderson et al. | Mar. 24, 1959 |
| 2,964,515 | Rader | Dec. 13, 1960 |

OTHER REFERENCES

Flory: Principles of Polymer Chemistry, Cornell University Press, Ithaca, N.Y. (1953), pages 142–143.